No. 614,841. Patented Nov. 29, 1898.
J. B. CONDE.
MACHINE FOR MAKING VIALS, SYRINGES, &c.
(Application filed Mar. 11, 1898.)
(No Model.) 4 Sheets—Sheet 2.

WITNESSES:
A. V. Groups
H. L. Cheeseman

INVENTOR
James B. Conde
BY John F. Nolan
ATTORNEY.

No. 614,841. Patented Nov. 29, 1898.
J. B. CONDE.
MACHINE FOR MAKING VIALS, SYRINGES, &c.
(Application filed Mar. 11, 1898.)
(No Model.) 4 Sheets—Sheet 3.

WITNESSES: INVENTOR
James B. Conde
BY
John R. Nolan
ATTORNEY.

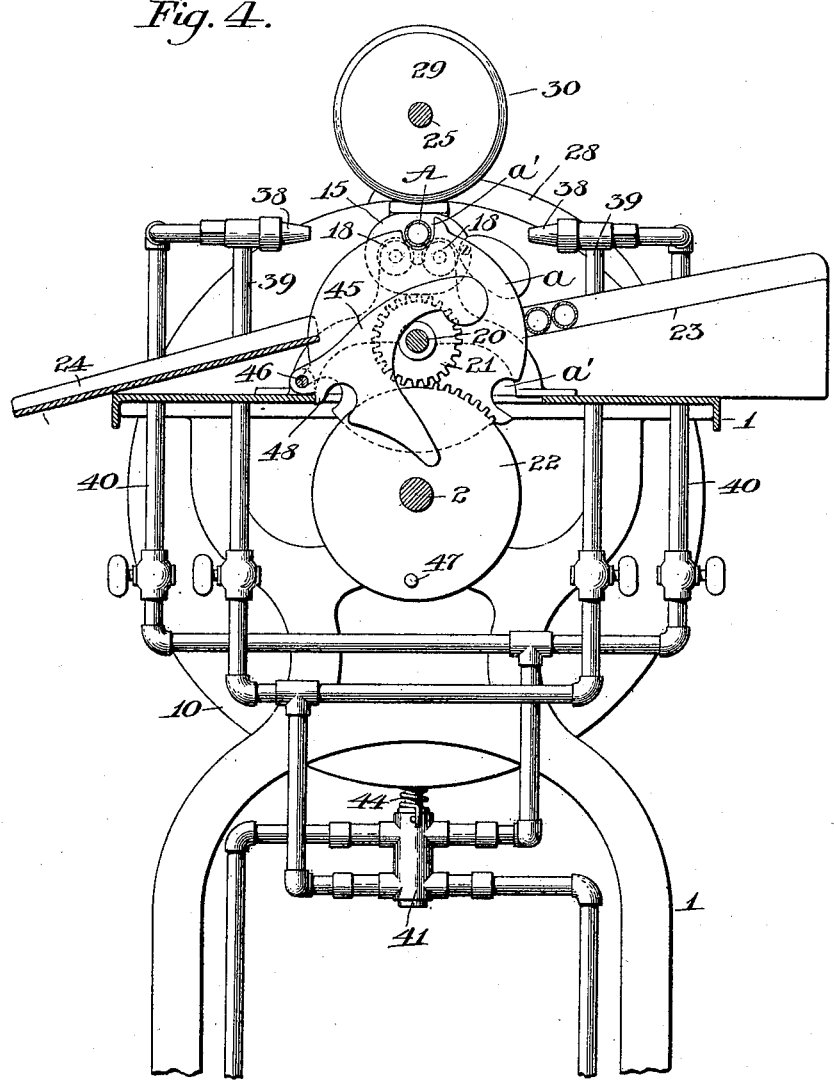

UNITED STATES PATENT OFFICE.

JAMES B. CONDE, OF CLIFTON HEIGHTS, PENNSYLVANIA.

MACHINE FOR MAKING VIALS, SYRINGES, &c.

SPECIFICATION forming part of Letters Patent No. 614,841, dated November 29, 1898.

Application filed March 11, 1898. Serial No. 673,499. (No model.)

*To all whom it may concern:*

Be it known that I, JAMES B. CONDE, residing at Clifton Heights, in the county of Delaware and State of Pennsylvania, have invented certain new and useful Improvements in Machines for Making Vials, Syringes, &c., of which the following is a full, clear, and exact description, reference being had to the accompanying drawings, forming a part of this specification.

This invention relates to machines for working tubular sections of glass in the production of vials and other bottles, syringes, and the like.

It has reference more especially to an organization of mechanism whereby glass tubes, previously necked and lipped at their respective ends, are each divided into two sections and bottoms formed thereon in a manner to produce two perfect vials or bottles, the operations of feeding the tubes to the machine, dividing and bottoming the same, and discharging the completed product being entirely automatic, as will hereinafter more fully appear.

Figure 1:
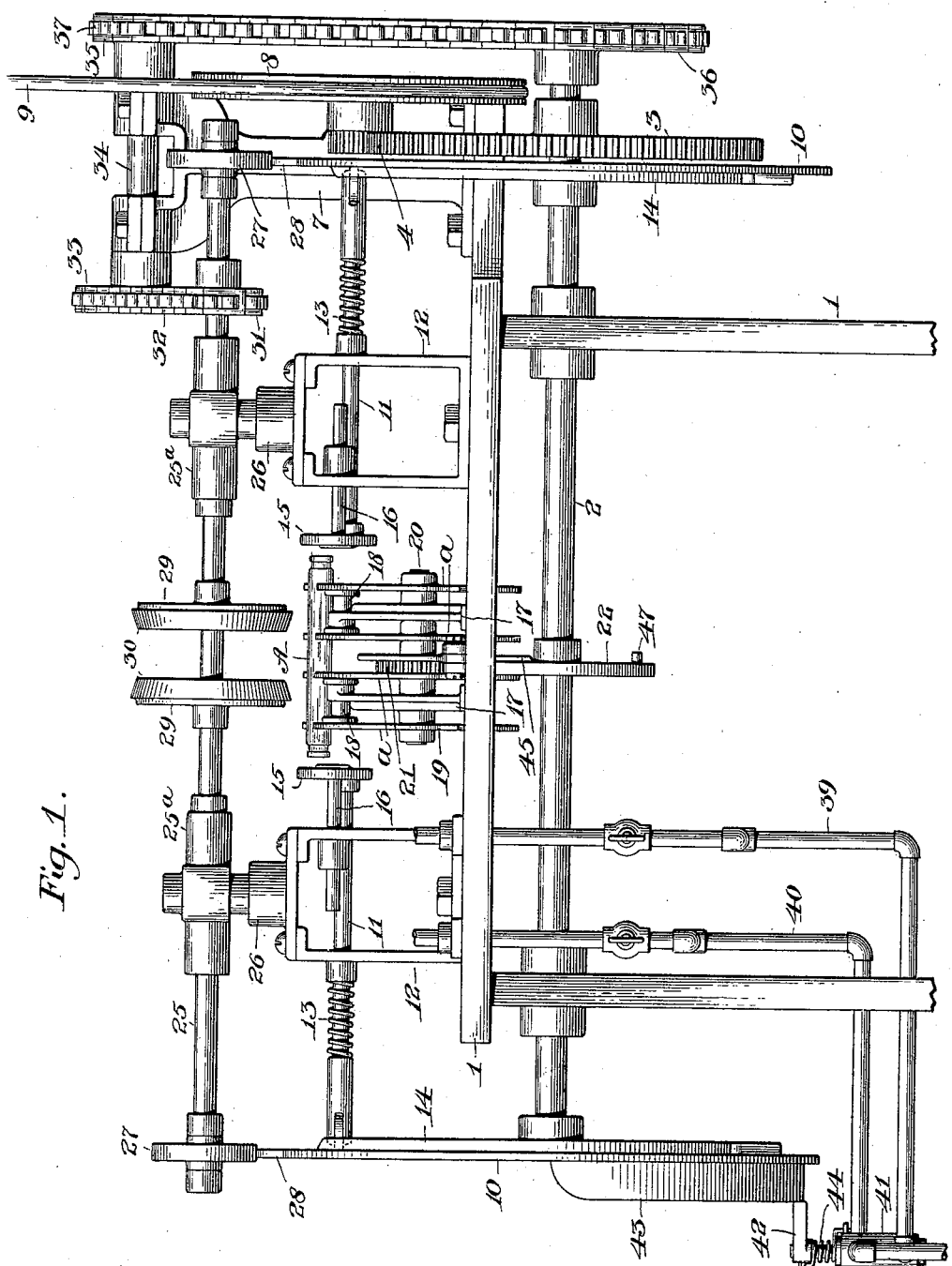
Figure 2:
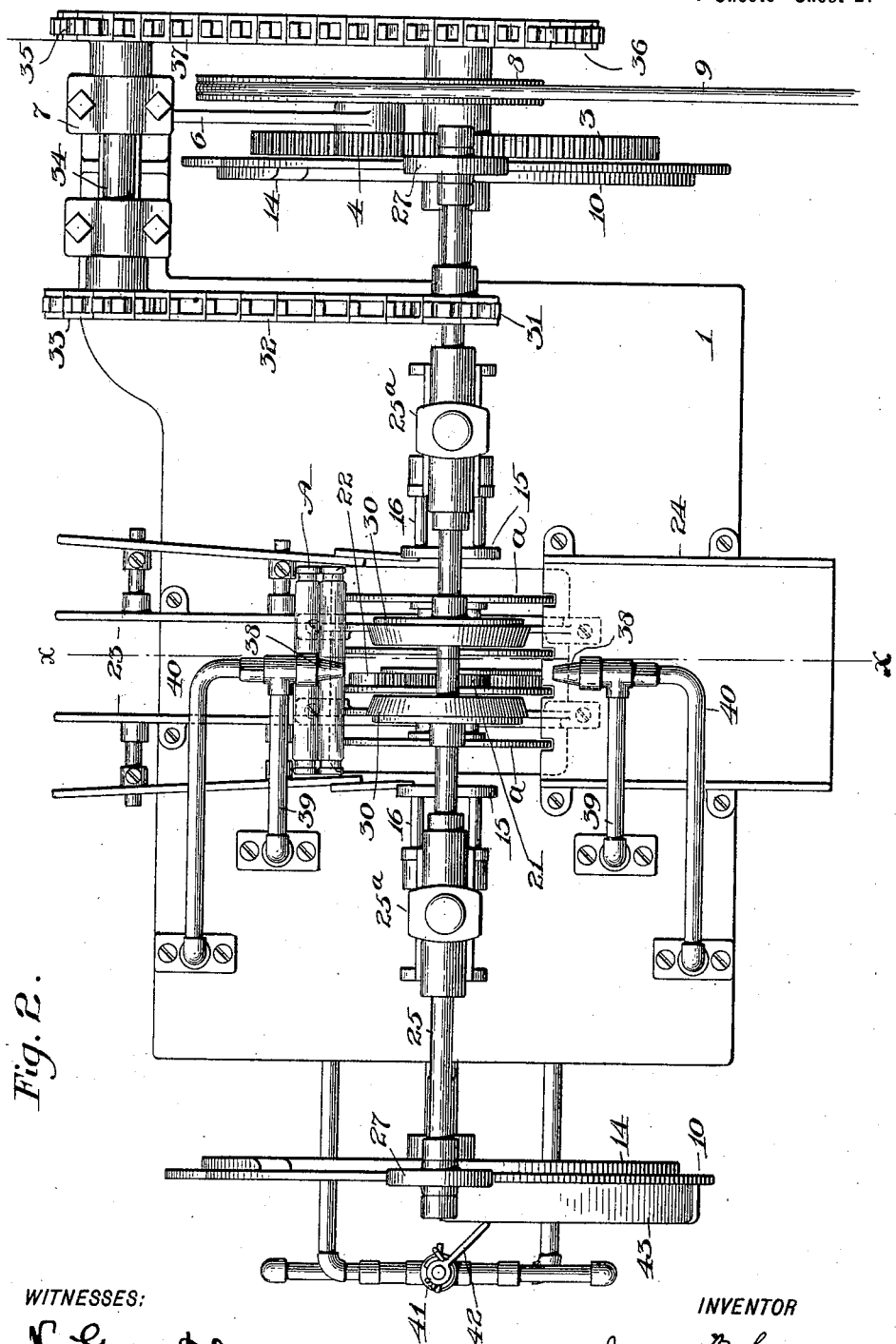
Figures 3, 5:
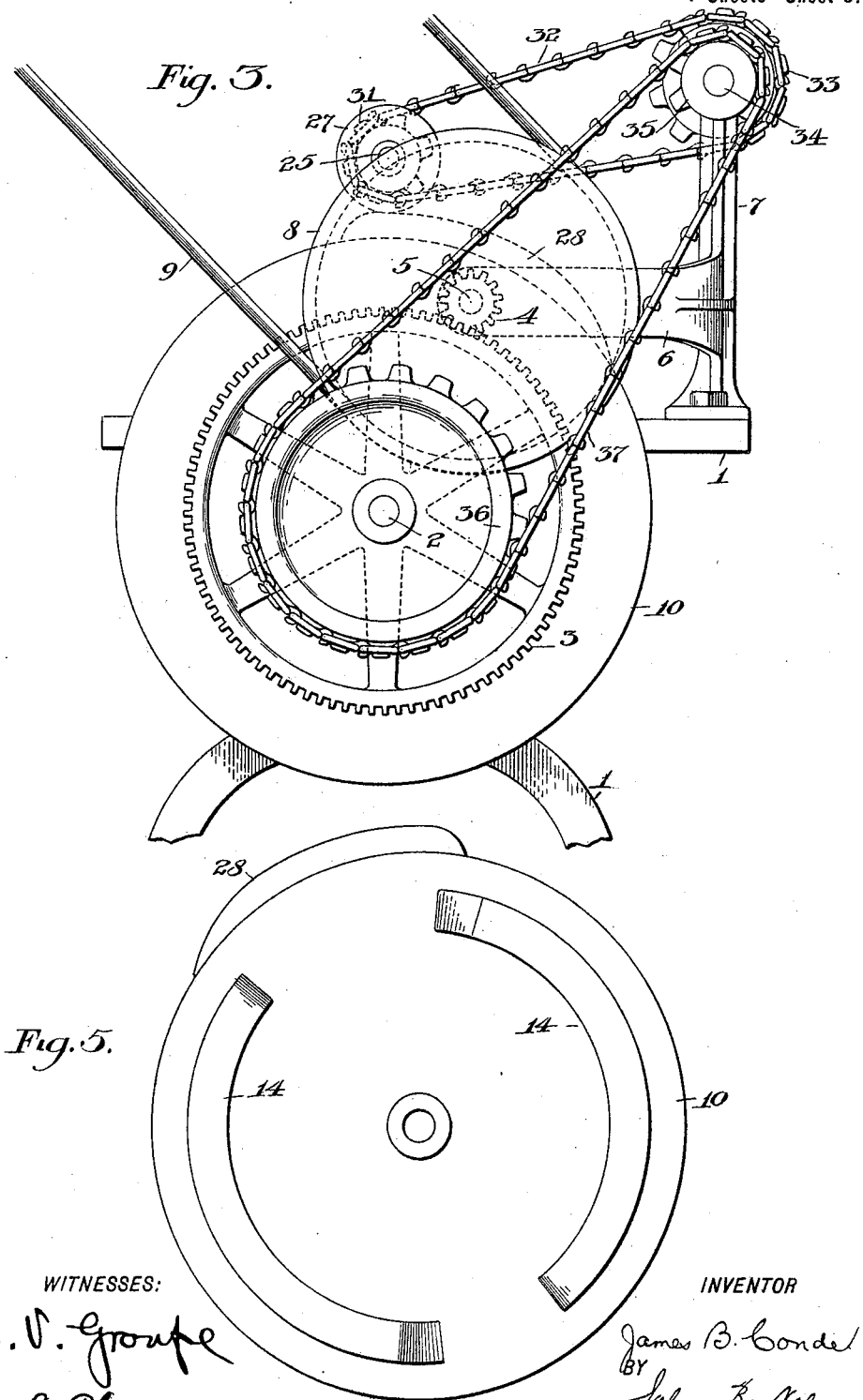

In the annexed drawings, Figure 1 is a side elevation of a machine embodying my invention. Fig. 2 is a plan thereof. Fig. 3 is an end view. Fig. 4 is a transverse section, line $x$ $x$, Fig. 2. Fig. 5 is an elevation of one of the governor-wheels detached.

The numeral 1 designates a substantial supporting-frame on which the various working parts of the machine are mounted. 2 is the main shaft, driven from a suitable source of power. In the present instance this shaft is provided with a spur-wheel 3, with which engages a pinion 4 on a stud-shaft 5, having its bearings in the arm 6 of a bracket 7 on the main frame. This stud-shaft carries a pulley 8, driven by the belt 9. On the shaft 2, at or near its respective ends, are governor-wheels 10, which coact with and control the movements of horizontally-reciprocating rods 11. These rods are mounted in brackets 12 on the supporting-frame and are maintained normally retracted and in contact with the respective governor-wheels by suitably-arranged springs 13. The governor-wheels are provided with appropriate cam-surfaces 14, which coact with the rods at intervals to effect their reciprocation. On the inner ends of these rods are heads 15, provided with guide-rods 16, that are fitted to guideways in the respective brackets. Hence the heads are uniformly reciprocated by and with the rods.

Mounted on the main frame midway between the heads are vertical cheeks or brackets 17, on the upper ends of which are journaled parallel rollers 18, onto which the glass sections or tubes A to be bottomed are singly carried by an intermittently-rotatable feed-wheel 19, and thereby supported in alinement with said heads, whereby when the rods are moved inward through the medium of the respective governor-wheels the heads simultaneously bear against the opposing ends of the section and adjust the same centrally of the machine. The feed-wheel in its preferred form comprises a series of parallel disks $a$— say four—affixed a suitable distance apart to a shaft 20, which is journaled in the brackets 17. On this shaft, intermediate the inner disks, is secured a pinion 21, with which are adapted to coact at predetermined intervals the teeth of a mutilated gear (or sector) 22, fast on the shaft 2, above referred to. The teeth of the gear are so disposed that during a partial revolution of the gear the pinion is turned thereby one-third of a revolution, thereupon remaining quiescent until the gear reëngages the pinion for a corresponding action. The peripheries of the disks $a$ are provided with a series of equidistant recesses $a'$, which constitute bearings for the glass sections, to the end that such sections may be bodily turned by and with the disks and also be independently rotatable when the feed-wheel is at rest. The glass sections to be bottomed are assembled in line upon an inclined trackway 23, which leads to the feed-wheel, so that the sections will gravitate toward the wheel. Hence during the partial rotation of the feed-wheel the opposing recesses on the respective disks will turn in proximity to the leading section on the trackway, which section will thereupon roll into said recesses, and in consequence be carried upward by the wheel and deposited upon the supporting-rollers 18. At this stage the mutilated gear 22 will escape the pinion 21, and the motion of the feed-wheel will therefore be arrested until the gear 22 reëngages the pinion for a succeeding operation. When the glass section is deposited upon the supporting-rollers, as above stated, the following operations take place through the instrumentality of the mechanism above described in conjunction with other devices, which will be hereinafter explained: The heads 15 are advanced against the ends of the glass section to adjust it. The section is then continuously rotated and heat applied to the middle thereof. The heads are then retracted and the ends of the section drawn outward to divide the same into two parts at the central or heated portion thereof, the severed portion of each part thus fusing at the center of the tube in a manner to close or "bottom" the same. The heads are then moved forward, so as to bring adjacent to but not in contact with each other the opposing bottoms thus formed. The heads are then retracted and a bottoming-plate caused to pass between the two parts. The heads are then advanced, so as to push such parts against the bottoming-plate, and thereby complete the formation of the bottoms. This done, the parts resume their normal positions, whereupon in the succeeding movement of the feed-wheel the two vials thus produced will be discharged onto a rearward off-bearing trackway 24, and another section will have been taken from the supply-trackway 23 and carried into position intermediate the heads.

The means whereby the central section is rotated and drawn endwise is of the following construction:

25 is a horizontal shaft extending directly above the feed-wheel. This shaft is journaled in vertically-movable bearing-blocks 25ª, which are fitted to vertical guides 26 on the brackets 12, whereby the shaft may be raised and lowered. On the ends of this shaft are rollers 27, which bear on the peripheries of the respective governor-wheels, the latter being provided with peripheral cam portions 28, which at predetermined intervals pass under the rollers and, perforce, raise the shaft. On or about the middle of this shaft are affixed two disks 29, with oppositely-beveled peripheries 30, of rubber or other suitable frictional material, that are adapted when the shaft is lowered to bear upon the centrally-disposed glass section. The peripheral pressure of the revolving disks upon the section tends to deflect their thin acting edges laterally in opposite directions, thus effecting the rotation of the section and at the same time forcing the ends of the section outward to divide the same, as above stated, the middle portion thereof being heated as below described. The shaft 25 may be driven in any suitable manner. In the present instance it is provided with a sprocket-wheel 31, which is geared by means of a sprocket-chain 32 with a wheel 33 on a shaft 34, having its bearings in the bracket 7, above referred to. On the outer end of this shaft is a sprocket-wheel 35, which is geared with a larger sprocket-wheel 36 on the end of the shaft 2 by means of a chain 37, whereby said shaft 34 is driven at a comparatively high rate of speed.

The means employed for heating the central portion of the rotating section comprises suitably-arranged blowpipes constructed to direct the flames against the body of the section from the opposite sides thereof. The burners are marked 38 and the gas and air supply pipes 39 40, respectively. These pipes are connected to a common valve 41, by means of which the supply of air and gas may be regulated. The valve-stem is provided with an arm 42, which extends into the path of a cam 43 on the side of the adjacent governor-wheel, which cam at a certain time coacts with the arm to shut off the air-supply and reduce the gas-supply. When the cam releases the arm, a torsional spring 44 opens the valve and permits the full supply of air and gas. The parts are so timed that the supply of gas and air is permitted only during the period required for heating the section, thereby economizing in the use of the gas.

The bottoming-plate above referred to is constructed in the form of a bell-crank lever 45, fulcrumed at 46 to lugs on the main frame in such manner that the upper arm of the lever may be swung between the divided parts of the centrally-supported glass section, the lower arm being appropriately formed to be actuated at a prescribed period by a stud 47 on the wheel 22 during the rotation of the latter. The plate is caused to assume its idle or normal position by gravity, a lug or shoulder 48 thereon abutting against the edge of the supporting-frame to limit the downward movement of the plate.

It will be obvious that the machine above described may be readily applied to the formation of syringes, ear-droppers, and like devices having tapering nozzles, the mechanism in such application being so arranged that the glass tube or section will be drawn out sufficiently to form a contracted central connection (at the middle of which the tube or section is subsequently cut off or broken) and the bottoming-plate being omitted.

I claim as my invention—

1. The combination, with means for supporting a glass section or tube, of a heating device, and means adapted to bear upon the body of said tube or section and thereby rotate the same by frictional contact.

2. The combination with parallel rollers adapted to support a glass section or tube, means for supporting said rollers, and heating devices, of means for bearing upon the body of said tube or section and thereby rotating the same by frictional contact.

3. The combination, with means for supporting a glass section or tube, of a heating device, and means for bearing upon the body of said tube or section and thereby rotating and longitudinally moving the same by frictional contact.

4. The combination, with means for supporting a glass section or tube, of a heating device for dividing said section or tube, means for bearing upon the body of said tube or section and thereby rotating the same and drawing the two parts thereof longitudinally in opposite directions by frictional contact.

5. The combination, with means for supporting a glass section or tube, of a heating device, a shaft, a disk thereon adapted to bear upon the body of said section or tube and rotate it by frictional contact, and means for rotating said shaft.

6. The combination with parallel rollers adapted to support a glass section or tube, means for supporting said rollers, and heating devices, of a shaft, a disk thereon adaped to bear upon the body of said section or tube and rotate it by frictional contact, and means for rotating said shaft.

7. The combination, with means for supporting a glass section or tube, of a heating device, a shaft, a disk thereon having a beveled yielding periphery adapted to bear upon the body of said section or tube, and means for rotating said shaft.

8. The combination, with means for supporting a glass section or tube, of a shaft, two disks thereon having oppositely-beveled yielding peripheries adapted to bear on the body of said section or tube, means for rotating said shaft, and means for heating the tube intermediate the disks.

9. The combination, with means for supporting a glass section or tube, of end heads, means for supporting and operating the same in respect to the ends of said section or tube, means for bearing upon the body of said tube and thereby rotating the same by frictional contact, and a heating device.

10. The combination, with means for supporting a glass section or tube, of end heads, means for supporting and operating the same in respect to the ends of said section or tube, means for bearing upon the body of said tube and thereby rotating and longitudinally moving the same by frictional contact, and a heating device.

11. The combination, with means for supporting a glass section or tube, of end heads, supporting-rods therefor, means for reciprocating said rods at predetermined intervals, a shaft having means for rotating said section or tube, means for rotating said shaft, means for raising and lowering said shaft at intervals, and a heating device.

12. The combination, with means for supporting a glass section or tube, of end heads, supporting-rods therefor, means for reciprocating said rods at predetermined intervals, a shaft having disks thereon with oppositely-beveled yielding peripheries, means for rotating said shaft, means for raising and lowering the same, and a heating device.

13. The combination, with means for supporting a glass section or tube, of end heads, supporting-rods therefor, governor-wheels co-acting with said rods, means for supporting and rotating said wheels, a shaft having means for rotating said section or tube, means for rotating said shaft, means for raising and lowering said shaft at intervals, and a heating device.

14. The combination, with a section or tube support, of a feed device, its supporting and operating parts, means for delivering the sections or tubes to said feed device, devices adapted to bear upon the tubes or sections on said support and thereby rotate and draw said tubes or sections, means for rendering said latter devices active and inactive at predetermined intervals, and heating devices.

15. The combination, with a section or tube support, of a feed device, its supporting and operating parts, means for delivering sections or tubes to said device, devices adapted to bear upon the tubes or sections on said support and thereby rotate and draw said tubes or sections, means for rendering said latter devices active and inactive at predetermined intervals, heating devices, and automatic means for regulating the operation thereof at intervals.

16. The combination, with means for supporting a glass section or tube, of end heads, means for supporting and operating the same, in respect to the ends of said section or tube, means for bearing upon the body of said section or tube and thereby rotating and longitudinally moving the same, a heating device, a bottoming-plate, and means for operating the same.

17. The combination, with a section or tube support, of a feed device, its supporting and operating parts, means for delivering the sections or tubes to said feed device, devices adapted to bear upon the tubes or sections on said support and thereby rotate and draw said tubes or sections, means for rendering said latter devices active and inactive at predetermined intervals, end heads, means for supporting and operating the same, a swinging bottoming-plate, and means for actuating the same, together with the heating devices.

18. The combination, with the supporting-frame, of the main shaft, the governor-wheels thereon, the reciprocative rods controlled thereby, the end heads on said rods, a support for glass sections or tubes intermediate said heads, means for feeding sections or tubes to said support, means for rotating and drawing said tubes or sections, and heating devices for said tubes or sections.

19. The combination, with the supporting-frame, of the main shaft, the governor-wheels thereon, the reciprocative rods controlled thereby, the end heads on said rods, a support for glass sections or tubes, intermediate said heads, means for feeding sections or tubes to said support, means for rotating and drawing said sections or tubes, heating devices, and automatic means for regulating the operation thereof.

20. The combination, with the section or tube support, of the intermittently-movable feed-wheel, the pinion connected therewith, the mutilated gear or sector, the main shaft, the governor-wheels, the reciprocative rods controlled thereby, the end heads on said rods, means for rotating a tube or section on said support, a lever-shaped bottoming-plate, means on said gear or sector adapted to coact therewith at predetermined intervals, and heating devices.

21. The combination, with means for supporting a glass tube or section, of a shaft, vertically-movable bearings therefor, means on said shaft adapted to bear upon the body of a tube or section and rotate the same, means for driving said shaft, a second shaft, governor-wheels thereon adapted to raise and lower said first-named shaft at predetermined intervals, and heating devices.

In testimony whereof I have hereunto affixed my signature in the presence of two subscribing witnesses.

JAMES B. CONDE.

Witnesses:
WALTER C. PUSEY,
ANDREW V. GROUPE.